(12) United States Patent
Zhao et al.

(10) Patent No.: US 7,480,058 B2
(45) Date of Patent: Jan. 20, 2009

(54) FOURIER-DOMAIN OPTICAL COHERENCE TOMOGRAPHY IMAGER

(75) Inventors: Yonghua Zhao, Fremont, CA (US); Jay Wei, Fremont, CA (US)

(73) Assignee: Optovue, Inc., Fremont, CA (US)

( * ) Notice: Subject to any disclaimer, the term of this patent is extended or adjusted under 35 U.S.C. 154(b) by 177 days.

(21) Appl. No.: 11/656,222

(22) Filed: Jan. 19, 2007

(65) Prior Publication Data
US 2007/0188765 A1 Aug. 16, 2007

Related U.S. Application Data

(60) Provisional application No. 60/760,050, filed on Jan. 19, 2006.

(51) Int. Cl.
*G01B 9/02* (2006.01)
(52) U.S. Cl. .................................... 356/497
(58) Field of Classification Search ................ 356/479, 356/497
See application file for complete search history.

(56) References Cited

U.S. PATENT DOCUMENTS

| 2003/0137669 | A1 | 7/2003 | Rollins et al. |
| 2004/0254474 | A1 | 12/2004 | Seibel et al. |
| 2005/0171438 | A1 | 8/2005 | Chen et al. |
| 2007/0177154 | A1* | 8/2007 | Rembe ................. 356/498 |
| 2007/0195269 | A1 | 8/2007 | Wei et al. |

OTHER PUBLICATIONS

Ferguson, R. Daniel et al., "Three-Dimensional Retinal Maps With Tracking Optical Coherence Tomography (TOCT)," Proc. of SPIE, Jan. 2005, vol. 5690:66-71.
Koozekanani, Dara et al., "Tracking the Optic Nerve Head in OCT Video Using Dual Eigenspaces and an Adaptive Vascular Distribution Model," 2001 IEEE Computer Society Conference on Computer Vision and Pattern Recognition, Dec. 8-14, 2001, vol. 1:I934-I941.
Kulkarni, Manish D. et al. "Automated Optic-Nerve-Head Analysis Using Optical Coherence Tomography," Proceedings of SPIE, Jun. 2002, vol. 4619:237-239.
Mujat, Mircea et al., "Retinal Nerve Fiber Layer Thickness Map Determined by Optical Coherence Tomography Images," Optics Express, Nov. 7, 2005, vol. 13(23):9480-9491.
Rohrschneider, Klaus et al., "Reproducibility of the Optic Nerve Head Tomography with a New Laser Tomographic Scanning Device," Journal of the American Academy of Ophthalmology, Jun. 1994, vol. 101(6):1044-1049.
Schuman, Joel S. et al., "Imaging of the Optic Nerve Head and Nerve Fiber Layer in Glaucoma," Ophthalmology Clinics of North America, Jun. 1995, vol. 8(2):259-279.

(Continued)

*Primary Examiner*—Hwa (Andrew) S Lee
(74) *Attorney, Agent, or Firm*—Finnegan, Henderson, Farabow, Garrett & Dunner, L.L.P.

(57) ABSTRACT

A Fourier-domain optical coherence tomography (OCT) imager is presented. An OCT imager according to the present invention can have an auto-alignment process. The auto-alignment process automatically adjusts at least one optical component of a spectrometer of the imager so that the spectrometer is aligned during an imaging session. In addition to the auto-alignment process, OCT spectra are normalized for background spectra and for noise characteristics in order to provide a more accurate and clear OCT image.

15 Claims, 6 Drawing Sheets

OTHER PUBLICATIONS

Webb, Robert H. et al., "Confocal Scanning Laser Ophthalmoscope," Applied Optics Apr. 15, 1987; vol. 26(8):1492-1497.
Weinreb, Robert et al., "Detection of Glaucoma With Scanning Laser Polarimetry," ARCH Ophthalmol, Dec. 1998, vol. 116:1583-1589.
Application as filed in U.S. Appl. No. 11/656,075.
Office Action dated Apr. 25, 2008, in related U.S. Appl. No. 11/656,075.
PCT International Search Report and Written Opinion mailed Apr. 2, 2008, in related International Application No. PCT/US07/01621.

* cited by examiner

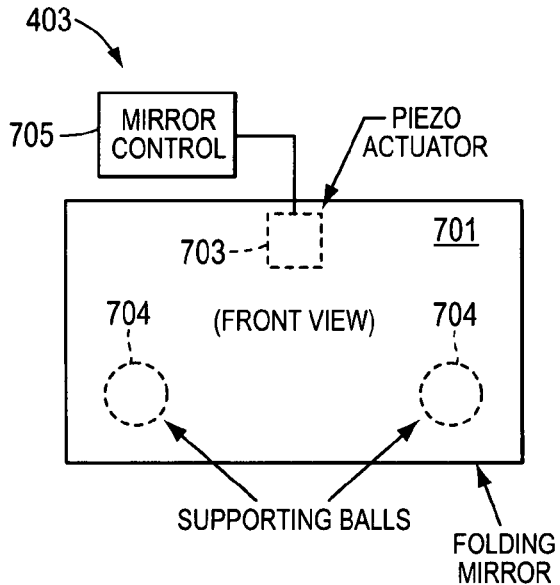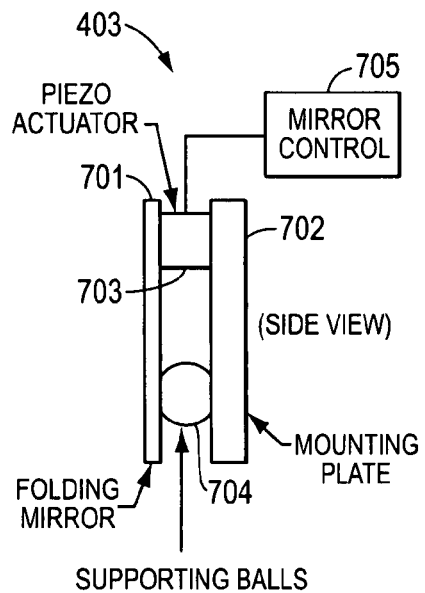
FIG. 7A
FIG. 7B
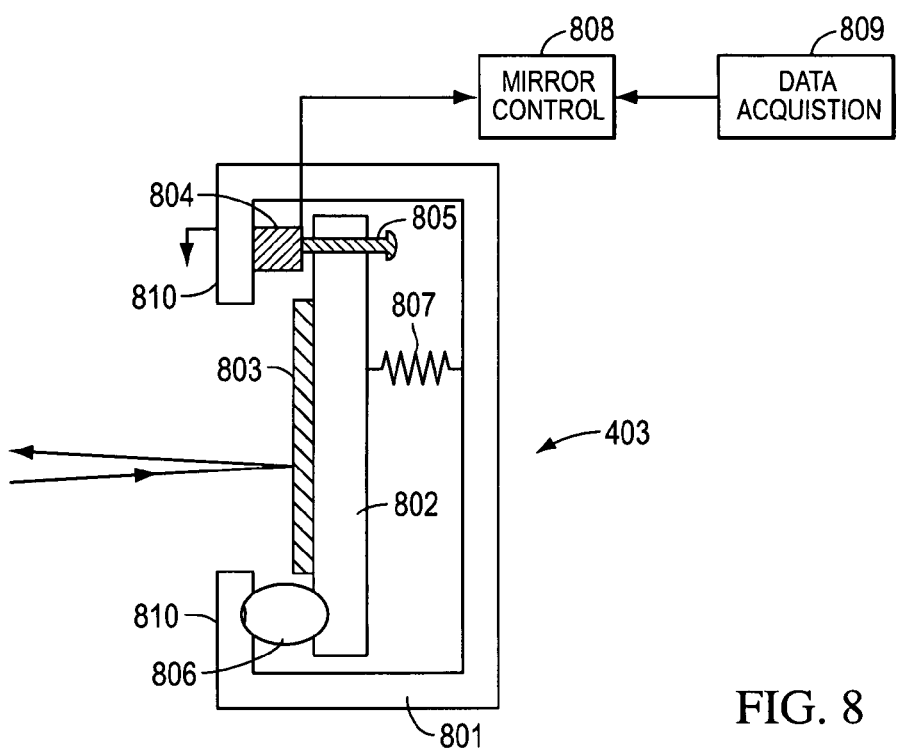
FIG. 8

US 7,480,058 B2

FOURIER-DOMAIN OPTICAL COHERENCE TOMOGRAPHY IMAGER

RELATED APPLICATION

The present application claims priority to Provisional Application No. 60/760,050, filed on Jan. 19, 2006, by Yonghau Zhao and Jay Wei, which is herein incorporated by reference in its entirety.

BACKGROUND

1. Field of the Invention

The present invention is related to a Fourier-domain optical coherence tomography imager and its operation.

2. Discussion of Related Art

Optical coherence tomography (OCT), developed in 1991 by MIT, has become an important medical imaging methodology, especially in ophthalmologic applications. The OCT technique is based on combining optical interferometer spectra from a longitudinal scan (also referred to as an axial scan, A-scan, or Z-scan) with a lateral scan (also referred to as an XY-scan). The XY scan can be in any lateral scanning pattern, including lines, circles, raster type scans, or any other pattern. The OCT image is constructed from optical interference signals while the OCT imager is performing A-scans and XY-scans. In most OCT devices, the A-scans are taken at a series of XY coordinates. In other words, an A-scan is taken at each point in an XY-scan to make a complete OCT image. As a result, the imaging speed is determined primarily by the A-scan scanning speed.

FIG. 1 illustrates an OCT imager 100 that can utilize the OCT technique. As shown in FIG. 1, a light source 101 provides light through a coupler 102 to a sample arm 103 and a reference arm 104. Reference arm 104 provides a known length and reflects light back into coupler 102. Sample arm 103 provides light to sample 106, which can be any object-of-interest, including an eyeball. The reflected light from sample arm 103 and the reflected light from reference arm 104 are combined in coupler 102 and the combined signal is coupled into detector 105.

FIG. 2 illustrates various scan types that can be performed in sample 106. Sample arm 103 can include optics for scanning light laterally across sample 106 to provide an XY-scan. The length of reference arm 104 may be mechanically varied to provide an A-scan or the A-scan can be the result of diffraction techniques utilized in detector 105. The image of the eye by OCT is measured by the interference between light from the sample arm 103 and reference arm 104 at detector 105.

OCT techniques can be divided into either time-domain OCT or Fourier-domain (or spectrum-domain) OCT. In time-domain OCT, the A-scan is usually provided by a mechanical scanning device in reference arm 104. Because of limitations in the mechanical scan, the A-scan speed in time-domain OCT is typically less than 5 kHz. Further increasing the scan speed may result in a poor signal-to-noise ratio because of the unmet requirements of wider electronic signal bandwidths. In Fourier-domain OCT, however, the A-scan is usually provided by a spectrometer in detector 105. The Fourier-domain OCT spectrometer typically includes a line-scan camera coupled to a diffraction grating. The line-scan camera, therefore, receives an optical interference signal as a function of wavelength. The OCT image can then be constructed after performing a Fourier transform on signals received at the line-scan camera. Because the line-scan camera can have a very high scan rate (typically >25 kHz), Fourier-domain OCT can provide a much higher imaging speed than time-domain OCT. Furthermore, Fourier-domain OCT can also provide a higher signal-to-noise ratio than time-domain OCT at the same A-scan rate, thanks to longer integration times of each detection element in the line-scan camera as opposed to typical detectors utilized in the time-domain OCT spectrometers. As a result, Fourier-domain techniques are becoming prevalent in new generations of OCT instruments.

Detector 105 in a Fourier-domain OCT, then, typically includes a high-efficiency, high-resolution spectrometer with very high precision optics and mechanics. The focusing beam in detector 105 of a Fourier-domain OCT spectrometer typically needs to be aligned to the detector array on a line-scan camera at the micrometer level, resulting in imager 100 being very sensitive to any environmental change such as vibration and temperature. The OCT instruments are to be utilized in a clinical setting, where they are portable and where it will be impractical or very expensive to control environmental conditions. Under such conditions, maintaining alignment of the OCT imager can become a limiting problem. Therefore, there is need for constant alignment of the spectrometer to compensate for environmental changes as well as the effects of moving the OCT imager around the clinic.

Furthermore, Fourier-domain OCT imaging typically has a non-uniform noise background that varies along scan depth (i.e., along the A-scan) because of 1/f noise and other factors. The un-compensated image can have much stronger noise background at smaller depth locations. Furthermore, the noise background typically shows linear and other simple relationship with depth location and may vary from system to system because of localized factors specific to each spectrometer. In some systems, such noise levels may show a fixed noise background pattern that can be confused with the OCT image itself.

In addition, the basic Fourier-domain OCT imager is a DC signal system that may present other shortcomings. The signal purity may be affected by DC background levels resulting from the spectrum of light source 101. Additionally, the DC background may change over time due to environmental changes, which also makes improving the OCT image challenging.

Therefore, there is a need for OCT spectrometers and imaging systems that appropriately compensate for the above described factors.

SUMMARY

In accordance with embodiments of the present invention, Fourier-domain OCT imagers that provide auto-alignment and auto-calibration are disclosed. In some embodiments, auto-alignment is performed by adjusting one or more optical elements in a detector arm and auto-calibration is performed by periodically taking a blank spectrum that can be utilized as a baseline spectrum in data processing.

An OCT imager according to some embodiments of the present invention can include a coupler coupled to receive light from a source arm and provide the light to a sampling arm and a reference arm, the coupler also being coupled to receive reflected light from the sampling arm and the reference arm and provide a combined interference signal to a detector arm; a broadband light source coupled to provide light to the source arm; an optical delay line coupled to receive light from the reference arm and reflect light back into the reference arm; an XY scan coupled to receive light from the sampling arm, direct that light onto a sample, capture reflected light from the sample, and couple the reflected light from the sample back into the sampling arm, the XY scan including an alignment position where no light is reflected back into the sampling arm; a spectrometer coupled to receive the combined interference signal from the detector arm and provide spectrum data, the spectrometer including at least one controllable component; and a controller that adjusts the at least one controllable component in response to spectrum data taken while the XY scan is in the alignment position so that the spectrometer is aligned.

In some embodiments, the spectrometer includes a folding mirror coupled to receive the combined interference signal from the detector arm; a transmission grating coupled to receive the reflected interference signal from the folding mirror; and a line scan camera coupled to receive diffracted light from the transmission grating.

In some embodiments, the controllable component is the folding mirror, the folding mirror including a mirror; an actuator coupled between the mirror and a frame, the actuator adjusting its length in response to an electrical signal; and a spacer coupled between the mirror and the frame, the mirror rotating on the spacer as the actuator is adjusted. The actuator may be a piezoelectric actuator. In some embodiments, a spring is coupled to hold the mirror snug against the actuator and the spacer.

In some embodiments, the controller provides the electrical signal in response to a difference in intensity measured by a first set of detectors in the line scan camera and intensity measured by a second set of detectors in the line scan camera, the second set of detectors being interspersed between the first set of detectors and laterally offset from the first set of detectors.

The imager may further include a computer executing software that receives data from the spectrometer; includes the controller; and compiles an OCT image.

A method of auto-aligning an OCT imager can include adjusting an XY scan so that no light is reflected into a sampling arm; coupling light reflected into a reference arm to a spectrometer; measuring intensity in a line scan camera in the spectrometer; and adjusting an optical component of the spectrometer to align the spectrometer. The spectrometer diffracts light into a line depending on wavelength; detects the light as a function of position on the line; and provides electrical signals indicative of the light intensity as a function of wavelength. In some embodiments, the spectrometer includes a mirror directing light onto a transmission grating and adjusting the optical component includes adjusting the mirror. In some embodiments, adjusting the mirror includes providing a voltage to a piezoelectric actuator coupled to adjust the position of the mirror with respect to the transmission grating.

A method of providing an optical coherence tomography (OCT) image according to some embodiments of the present invention includes acquiring a number of background spectra; averaging the background spectra to calculate a background spectrum; normalizing each of the number of background spectra by the background spectrum to form a number of normalized background spectra; processing by Fourier transformation each of the number of normalized background spectra, and averaging the processed number of normalized background spectra to form a background noise spectrum; acquiring an A-scan signal for each point in an XY scan; normalizing the A-scan signal by the background spectrum; processing by Fourier transformation the normalized A-scan signal; and normalizing the processed A-scan signal by the background noise spectrum to calculate an OCT image. Acquiring the background spectra can include adjusting an XY scan optics so that no light is reflected into a sample arm; receiving light into a spectrometer only from a reference arm; and measuring intensity of the light as a function of wavelength in the spectrometer. Further, the spectrometer may be aligned before OCT image data is acquired.

These and other embodiments of the invention are further discussed below with reference to the following figures. It is to be understood that both the foregoing general description and the following detailed description are exemplary and explanatory only and are not restrictive of the invention, as claimed.

BRIEF DESCRIPTION OF THE DRAWINGS

FIGS. 7A and 7B illustrate an auto-adjustable component that can be utilized in the spectrometer illustrated in FIG. 4.

FIG. 8 illustrates an auto-adjustable folding mirror that can be utilized in the spectrometer illustrated in FIG. 4.

In the figures, elements having the same designation have the same or similar functions.

DETAILED DESCRIPTION

Figure 1:
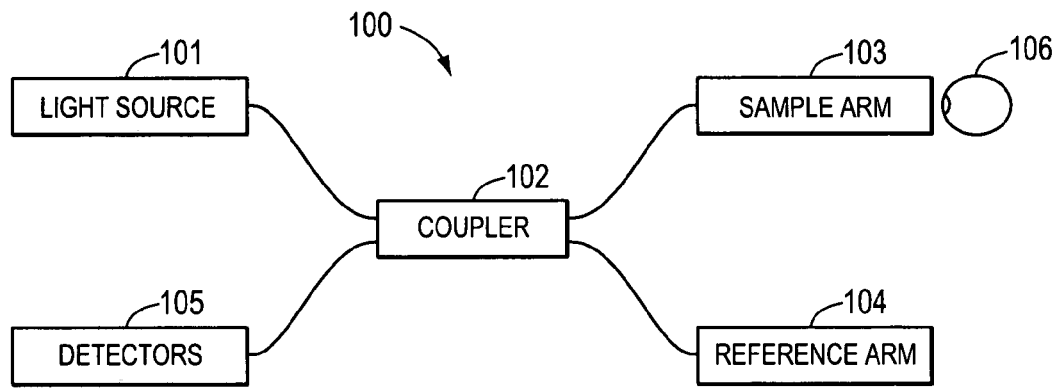
FIG. 1 illustrates the OCT technique.
Figure 2:
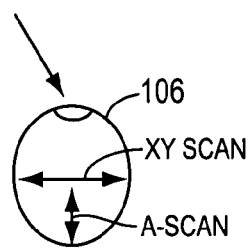
FIG. 2 illustrates XY and A-Scans in the OCT technique.
Figure 3:
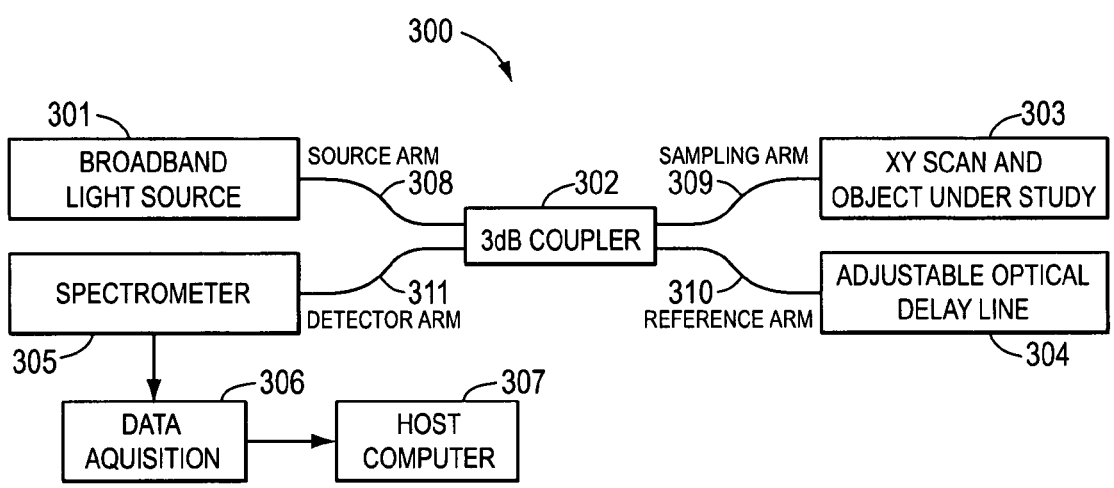
FIG. 3 illustrates a Fourier-domain OCT imager according to some embodiments of the present invention.

FIG. 3 illustrates a Fourier-domain OCT imager 300 according to some embodiments of the present invention. As shown in FIG. 3, Fourier-domain OCT imager 300 includes a broadband light source 301 coupled to supply light to light source arm 308. Source arm 308 is coupled to provide the light to a coupler 302. Coupler 302 splits the light between sampling arm 309 and reference arm 310. Sampling arm 309 includes XY scan 303, which couples light into an object-of-interest, which can be an eye. Reference arm 310 includes an adjustable optical delay line 304. Light reflected into reference arm 310 and sampling arm 309 is combined in coupler 302 and coupled into detector arm 311. Detector arm 311 includes a spectrometer 305. Additionally, spectrometer 305 is coupled to a data acquisition electronics 306, which can be coupled to a host computer 307. Further, in some embodiments, optics in XY scan 303 and adjustable delay line 304 can be controlled by data acquisition 306 or by host computer 307.

Broadband light source 301 can, for example, be a superluminescence light-emitting diode (SLED) with a wavelength of about 840 nm and bandwidth of about 50 nm. Light from broadband light source 301 may then be coupled into a single-mode fiber and then coupled to coupler 302. In some embodiments, coupler 302 may be a 2×2 3 dB fiber coupler and the single-mode fiber of source arm 308 may be coupled into the source arm of the fiber coupler. The 3 dB coupler acts like a beam splitter that splits the incoming light from source arm 308 into two arms: reference arm 310 that includes an adjustable optical delay line 304; and sampling arm 309 that includes XY scan device 303 and an object under study, such as a retina, cornea, or other sample.

Figure 13:
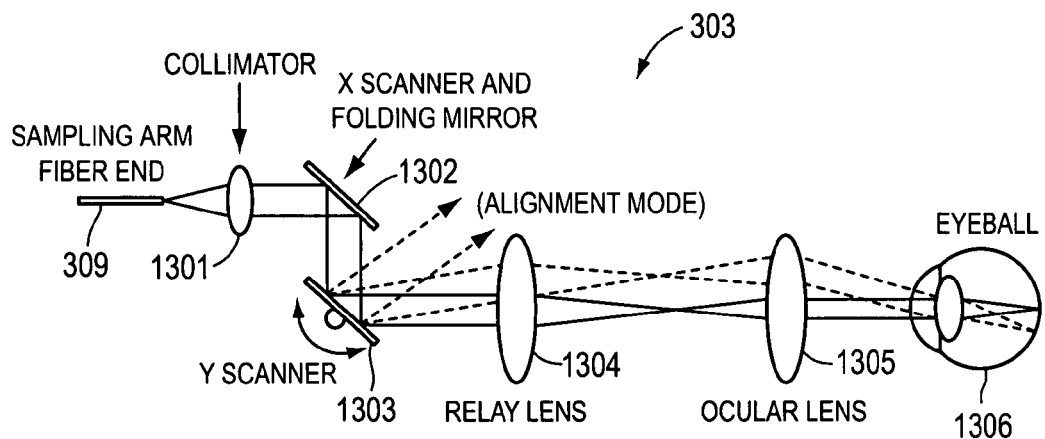
FIG. 13 illustrates XY scan optics that can be utilized in some embodiments of the present invention.

FIG. 13 illustrates an embodiment of XY scan 303 that can be utilized in some embodiments of the present invention. The embodiment of XY scan 303 shown in FIG. 13 includes a collimator lens 1301, an X scan mirror 1302, a Y scan mirror 1303, a relay lens 1304, and an ocular lens 1305. XY scan 303 directs light into an object-of-interest, which in FIG. 13 is represented by eyeball 1306. X scan mirror 1302 is rotated to direct the beam in an X direction on eyeball 1306. Y Scan mirror is also rotated to direct the beam in a Y direction on eyeball 1306. As is further shown, light reflected from eyeball 1306 is directed back into sampling arm 309. As is further shown in FIG. 13, Y scan mirror 1303 can be rotated such that light is directed into a direction where it can not be reflected back into sampling arm 309. The rotation of X mirror 1302 and Y mirror 1303 can be controlled electrically.

The light in XY scan 303 is focused on the object-under-study to get maximum back reflection and/or scattering, which will be collected by XY scan 303 again and then coupled back into the single-mode fiber of sampling arm 309. Light is also back-reflected from adjustable optical delay line 310 into the fiber of reference arm 310. The two back-reflected optical signals, one from sampling arm 309 and the other from reference arm 310, are mixed in coupler 302 to generate an interference signal. The interference signal is coupled into detector arm 311, which is coupled to spectrometer 305. Typically, light entering spectrometer 305 is coupled through a diffraction grating onto a line scan camera.

Spectrometer 305 provides an array of electronic signals indicating the light intensity as a function of wavelength, which provides the spectrum of the interference signal. The output signal from spectrometer 305 is acquired by a data acquisition device 306, which in some embodiments can be a frame grabber, and then transferred to host computer 307 for processing, including construction of an OCT image.

Adjustable optical delay line 304 is typically adjusted to a position where the optical interference signal measured in spectrometer 305 can be resolved by spectrometer 305. Typically, the spectrum can be resolved in spectrometer 305 if the total optical path length difference between sampling arm 309 and reference arm 310 is less than the maximum scan depth that OCT imager 300 achieves.

Figure 4:
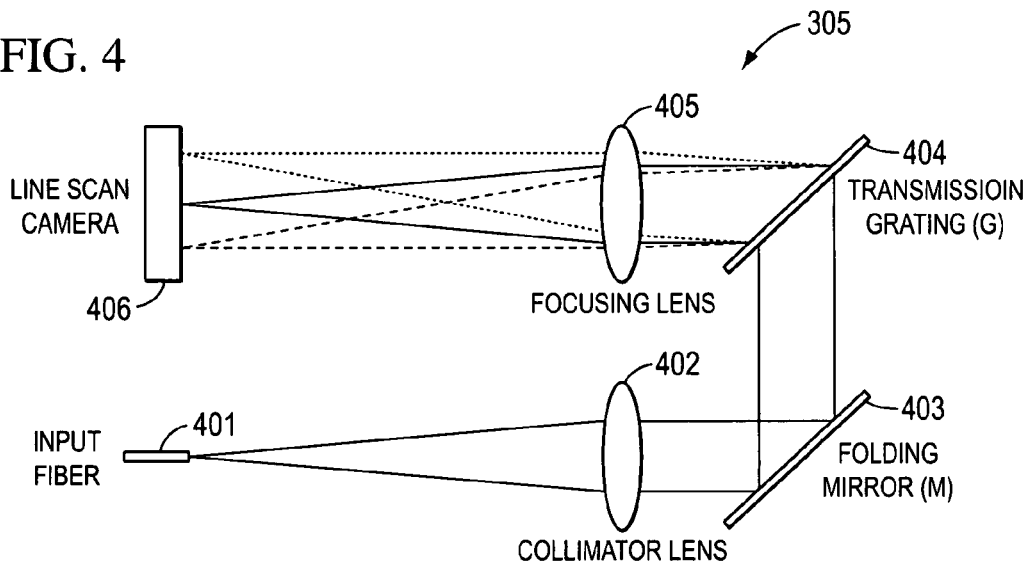
FIG. 4 illustrates an embodiment of a spectrometer that can be utilized in an OCT imager according to some embodiments of the present invention.

FIG. 4 illustrates an example spectrometer 305 according to some embodiments of the present invention. In general, light from input fiber 401 is incident on a diffractive device such as diffraction grating 404 and directed to a line scan camera 406. In the embodiment specifically shown in FIG. 4, spectrometer 305 receives light from input fiber 401. Collimating lens 402 collimates the light from fiber 401 and directs it onto folding mirror 403. Folding mirror 403 reflects the light onto transmission grating 404. Light is then focused by focusing lens 405 onto a line scan camera 406. The light incident on line scan camera 406 is a line where position in the line is dependant on wavelength. Therefore, the signal detected on each pixel (or detector) indicates the intensity of the OCT signal at a particular wavelength.

FIG. 4 illustrates that grating 404 is a transmission grating, a reflection grating or other dispersive element where light is dispersed as a function of wavelength can be used. To achieve high efficiency, the optical design of spectrometer 305 should be optimized so that the light from the input fiber is imaged into CCD elements of line scan camera 406 as much as possible. Because of the small pixel size of typical line scan cameras (typically 10 µm by 10 µm), spectrometer 405 can be very sensitive to environmental conditions such as temperature, mechanical vibrations, and other conditions. Keeping spectrometer 305 aligned is a large task and should be done periodically during operation of the OCT imager. Keeping such an alignment makes Fourier-domain OCT very difficult to use in clinical applications. To overcome this limitation, some embodiments of the present invention include active auto alignment and thus provide un-interrupted operation of OCT imager 300.

Figure 5:
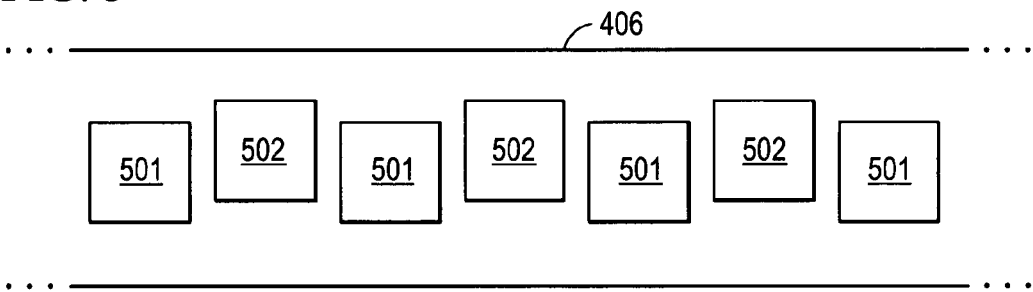
FIG. 5 illustrates a line scan camera that can be utilized in the spectrometer illustrated in FIG. 4.

FIG. 5 illustrates an embodiment of line scan camera 406. As shown in FIG. 5, line scan camera 406 includes an array of optical detectors 501 and 502, which can be any optical detector and in some embodiments are charge-coupled devices (CCDs). Generally, detectors 501 and 502 are arranged along a single line. The number of detectors 501 and 502 determine the resolution of the camera. A line scan camera may include any number of detectors, for example 1024 or 2048 detectors.

The beam from grating 404 is spread as a function of wavelength across a line in the horizontal direction with respect to the orientation of detectors 501 and 502 (i.e., detectors 501 and 502 are arranged in the horizontal direction). There are three ways in which the beam may be out of alignment: by vertical misalignment (i.e. the beam is displaced in a direction perpendicular to the horizontal), by horizontal misalignment (i.e., the beam is displaced horizontally), or by rotational misalignment (the line of the beam is rotated with respect to the line of detectors 501 and 502).

Adjustments to spectrometer 305 can be made in various ways. For example, rotational alignment can be made by rotating grating 404 to rotate the lateral beam relative to the horizontal direction defined by the array of detectors 501 and 502 of camera 305. Further, horizontal alignment can be made by adjusting grating 404 to shift the beam horizontally on detectors 501 and 502. A vertical adjustment can be made by adjusting the orientation of mirror 403 so that the beam of light for all of the wavelengths is deflected to be optimally incident on detectors 501 and 502. In some embodiments of spectrometer 305, rotational alignment, horizontal alignment, and vertical alignments of the beam from grating 404 are set in a periodic maintenance alignment and those settings are kept constant during operation of the imager until the next maintenance period. In each of these alignments, the beam is aligned to maximize the power received at camera 305 with known conditions. Known conditions can be achieved, for example, by directly only the light reflected into reference arm 310 into spectrometer 305.

However, as discussed above, the alignment of spectrometer 305 will drift with use and environmental conditions. Therefore, in some OCT instruments according to the present invention, one or more of vertical, horizontal, or rotational alignments are accomplished in an auto-alignment step during, or just prior to, an imaging session. An imaging session is a time period during which an OCT imager, or part of an OCT image, is acquired by OCT imager 300.

In some embodiments, an auto-alignment step for vertical alignment of the beam is initiated at the beginning of each imaging session. A fine auto-alignment of the beam in the horizontal direction may not be necessary because a small misalignment in the horizontal direction only means a small spectrum shift, in the level of several pixels, which can be ignored or compensated by software operating in computer 307. Because there usually are more than one thousand pixels in line scan camera 406, such a small spectrum shift should not affect the performance of the OCT imager significantly.

Additionally, auto-rotational alignments may not be necessary. Auto-alignments are typically more robust (i.e., less sensitive to environmental conditions) than translational alignments. Further, if the rotational alignment is slightly off, there should be little effect on the performance because of the vertical extent of detectors 501 and 502. Typically, detectors 501 and 502 and vertical auto-alignment are about 10 μm high, so a rotational misalignment such that the ends of the beam are shifted by less than 5 or so microns should have little effect on the performance.

Vertical shifts in the beam can have significant performance consequences. Additionally, vertical misalignment is much more common an occurrence and much more likely to happen as the instrument adjusts to changing environmental conditions and as the instrument is moved about the clinic.

One auto-alignment methodology is to adjust the optics of spectrometer 305 to maximize the total optical power received by line scan camera 402. The total power can be calculated by summing the signals from all of detectors 501 and 502. However, this procedure may not be reliable if the reflected power from sampling arm 404 is not negligible and varies over time and from object to object. An alignment algorithm based on total power received at line scan camera 402 would be exceedingly difficult since the actual input power into spectrometer 305 is not fixed.

Figure 6:
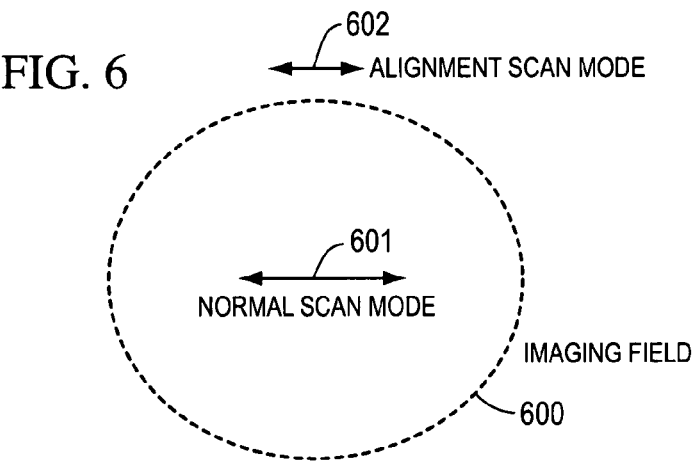
FIG. 6 illustrates a process that can be utilized during alignment.

FIG. 6 illustrates an auto-alignment procedure according to some embodiments of the present invention. FIG. 6 illustrates the imaging field 600 of XY scan 300 shown in FIG. 3. During operation, the object-of-interest is placed within imaging field 600. During imaging, XY scan 303 directs the light in a normal scan mode 601, with light being reflected back into sampling arm 309 by the object-of-interest in imaging field 600. However, during an alignment process, the optics in XY scan 300 are set to direct the beam in sampling arm 309 to alignment mode 602, which is directing the light beam outside of imaging field 600. As a result, no light is reflected back through sampling arm 309 and the reflected light from reference arm 310, which is not dependent on the object-of-interest, can be utilized for aligning spectrometer 305.

FIGS. 7A and 7B illustrate an embodiment of a folding mirror 403 that can be utilized in spectrometer 305. The embodiment of folding mirror 403 shown in FIGS. 7A and 7B includes a mirror 701 and a mounting plate 702. Mounting plate 702 and mirror 701 are coupled to opposite ends of a piezo actuator 703. Further, mounting plate 702 and mirror 701 are separated by supporting balls 704. The length of piezo actuator 703 varies with a voltage applied across actuator 703. Therefore, mirror 701 can be tilted to direct the light from collimating lens 402 (FIG. 4) relative to line-scan camera 406. The beam on line-scan camera 406, then, can be adjusted by varying the voltage across piezo actuator 703. As shown in FIGS. 7A and 7B, a mirror controller 705 is electronically coupled to piezo actuator 703 in order to control the voltage across piezo-actuator 703, which controls the orientation of mirror 701 relative to mounting plate 702.

The total optical power on line scan camera 406 can be calculated by summing the signal from each of detectors 501 and 502. By adjusting the voltage across piezo actuator 703, the total optical power can be maximized. During the auto-adjustment operation, the input power into spectrometer 406 should be held constant. To make sure that the power is not affected by light coming back from sampling arm 309, XY scan device 303 should be set to a alignment scan mode 602 so that the XY scanning beam is out of the imaging field, as shown in FIG. 6. During normal scan, the XY scanning beam is usually inside imaging field 600. During auto-alignment time, the XY scanning beam is out of the imaging field 600 by applying a very large offset in XY scan device 303. No light will be reflected into sampling arm 309 because the scan beam is directed to the field aperture, which can be considered a non-reflection material. As a result, only the light reflected back from reference arm 310 will get to spectrometer 305, resulting in a constant power beam on spectrometer 305 during the auto-adjustment procedure.

In some embodiments, mirror control 705 can be coupled directly to data acquisition 306 (FIG. 3). In some embodiments, mirror control 705 can be coupled to host computer 307. As discussed above, auto-alignment of spectrometer 305 can be accomplished with the optics of XY scan 303 of sampling arm 309 in alignment mode 602. At that point, light reflected in reference arm 310, without light from sampling arm 309, is directed to spectrometer 305.

As shown in FIG. 5, some embodiments of line scan camera 406 are arranged so that detectors 501 of line scan camera 406 are slightly vertically offset from detectors 502. There will be a notable optical power difference between detectors 501 and detectors 502 when the beam is misaligned. In some embodiments, the optimization algorithm is to adjust folding mirror 403 to minimizing the optical power difference measured by detectors 501 and 502.

This algorithm is generally fast because the direction in which to adjust folding mirror 403 is dependent on the sign of the difference in total optical power measured by detectors 501 and total optical power measured by detectors 502. An indication of whether the beam incident on line scan camera 406 is aligned is the difference between the total intensity measured by detectors 501 and the total intensity measured by detectors 502. If the beam is too high, the total intensity measured by detectors 502 will be higher than the total intensity measured by detectors 501. The opposite is true if the beam is too low.

A feed-back loop where the voltage across piezo actuator 703 is changed (adjusting the length of actuator 703) until the difference between the total intensity measured by detectors 502 and the total intensity measured by detectors 501 is below a threshold value can be implemented. This feed-back loop can be implemented in data acquisition 306, in host computer 307, or in mirror control 705. Therefore, by applying different voltage on piezo actuator 703, the actual length of piezo actuator 703 can be changed. As a result, the vertical angle of folding mirror 403 is adjusted according to the voltage applied to piezo actuator 703, and then the focusing beam on line scan camera 406 can be moved up and down, on a micrometer length scale, to match the location of detectors 501 and 502.

FIG. 8 illustrates another embodiment of folding mirror 403. As shown in FIG. 8, folding mirror 403 includes a mirror 803 mounted on a backing 802. Mirror 803 and backing 802 are mounted within a frame 801, which can be part of the overall frame for spectrometer 305. Frame 801 includes lips 810. A spacer 806 is provided between backing 802 and lip 810 on one side of backing 802 while a piezo actuator 804 separates backing 802 and lip 810 on the opposite side of backing 802. In some embodiments, spacer 806 includes one or more spherical bearings, however, a cylindrical spacer or other spacer can be utilized. Spacer 806 allows backing 802 to rotate around spacer 806. Backing 806 can be in snug contact with piezo actuator 804. A spring 807, which in the embodiment shown in FIG. 8 is under compression, is provided between backing 806 opposite mirror 803 and frame 801. Spring 807 holds backing 802 firmly against spacer 810 and pizeo actuator 804. In some embodiments, an adjustment screw 805 is provided between backing 802 and pizeo actuator 804. In some embodiments, adjustment screw 805 may pass through lip 810 instead of backing 802. Adjustment screw 805 provides an initial or course alignment adjustment that can be set when OCT imager 300 is serviced.

As shown in FIG. 8, piezo actuator 804, whose length is adjustable by providing a voltage across actuator 804, adjusts the orientation of mirror 803, providing the adjustment to the light beam on line scan camera 406. Piezo actuator 804 (or piezo actuator 703 above) can be a stacked piezo-electric device available, for example, from ThorLabs, Newton, N.J. In some embodiments, piezo actuator 804 is extended to its full length upon application of about 100 V across actuator 804. Actuator 804 can be any device that has a length that can be controlled electronically, for example any type of translation stage (in vertical direction) such as linear motor, stepping motor, or ultrasonic motor, that can adjust the vertical position of input fiber, or line scan camera, or collimator lens, or focusing lens. In systems where a reflection grating is used instead of a transmission grating, the auto-alignment actuator could also be placed with the grating mount.

Actuator 804 is electronically coupled to mirror control 808, which receives signals from source 809. Source 809 may be data acquisition 306 or host computer 307. As described above, the length of actuator 804 is adjusted in response to the signals from detectors 501 and 502 of line camera 406 until the beam is aligned with camera 406. In some embodiments, the length of actuator 804 is adjusted in response to the difference in total intensity incident on detectors 501 and the total intensity incident on detectors 502.

Although auto alignment has been described using folding mirror 403 as the adjustable component, any component that can affect the location where the beam is incident on scan camera 406 can be utilized. For example, the location of camera 406, the orientation of focusing lens 405, or the orientation of transmission grating 404 can be utilized. In systems that utilize a reflecting grating instead of a transmission grating, the orientation of the reflecting grating can be utilized as the adjustable element for auto-alignment.

Therefore, in accordance with some embodiments of the present invention, an auto-alignment step is added at the beginning of each OCT imaging session. During this auto-alignment step, XY scan 303 is set to Alignment Scan Mode 602, where there is no reflected beam in sampling arm 309. Host computer 307 then performs data acquisition from line scan camera 305 and calculates the optical power received by detectors 501 and 502 of line scan camera 305. Computer 307 then directs mirror control 705 or 808 to adjust the orientation of folding mirror 403 to minimize the difference between the total power in detectors 501 and the total power in detectors 502. As discussed above, some embodiments of the invention adjust mirror 403 to maximize total power and some embodiments adjust other components of spectrometer 305 to align the optical beam with line scan camera 406 before the session. Although this procedure can be performed periodically during an OCT session (i.e., a session where one or more OCT images of an object-of-interest are taken), the auto-alignment process can be performed at any time during the OCT session.

It should be noted that, once vertically aligned, a difference in measured power from one side of line scan camera 406 o the other side of line scan camera 406 indicates rotational or horizontal misalignment. In some embodiments, an auto-rotational alignment, an auto-horizontal alignment, or both may be performed utilizing the difference in incident power measured by left and right detectors of line scan camera 406. In some embodiments, a large difference in the power measured by the left detectors from the power measured by the right detectors can be utilized to indicate to an operator that a manual alignment is needed.

In addition to alignment issues, OCT imaging suffers from noise and distortion issues. In particular, there may be a fixed noise background pattern in un-compensated Fourier-domain OCT images that, if not taken into consideration, can easily distort the resulting OCT image. Additionally, the OCT spectra should be normalized for the spectral profile of broadband light source 301. In some embodiments of OCT imaging according to the present invention, the background noise pattern can be eliminated by subtracting background spectrum. In some embodiments, the background spectrum is the spectrum signal from reference arm 310 while XY scan 303 is placed in a position so as to not reflect light into sampling arm 309. As discussed above, the OCT spectrum is the combined signal from sampling arm 309 and reference arm 310, which is an interference signal. Combining the reflected signals from reference arm 310 and sampling arm 309 converts the DC-like spectrum signal into an AC signal (the interference signal), which helps to clarify the OCT image and make the resolution consistent over different depth locations.

Figure 9:
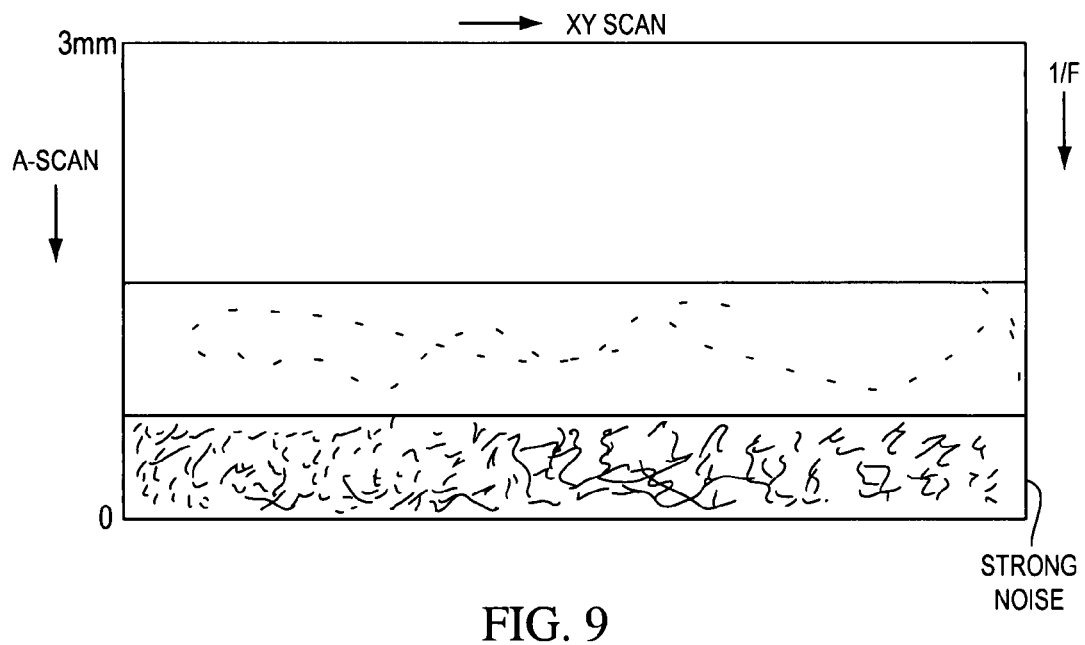
FIG. 9 shows noise distribution in an OCT image.

FIG. 9 illustrates the noise characteristics of a standard OCT image. As shown in FIG. 9, the $1/f$ noise increases with decreasing A-scan depth. Additionally, simply subtracting a baseline spectrum may not reduce the $1/f$ noise in the OCT spectrum appreciably.

Although a background spectrum can be determined and subtracted from the OCT spectrum, the background spectrum may change over time due to environmental changes, especially temperature changes, in the OCT instrument. Even with automatic spectrometer alignment, the spectrum may still be different at different times. If the spectrum subtracted from the OCT spectrum is not the current background spectrum, the non-uniform noise background and other detrimental effects re-appear and can distort the OCT image.

Figure 10:
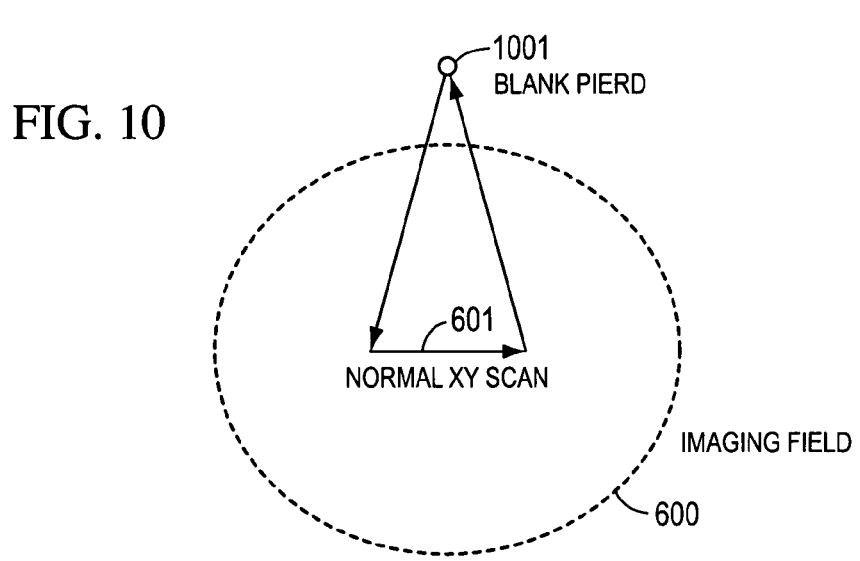
FIG. 10 illustrates an OCT imaging process according to some embodiments of the present invention.

Therefore, in accordance with some embodiments of the present invention, the background spectrum is updated frequently. FIG. 10 illustrates an example of a procedure for performing an OCT image scan according to some embodiments of the present invention. As demonstrated in FIG. 10, each sequence of XY scan starts from a blank point 1001 that is located outside of imaging field 600 of XY scan optics 303. A certain number of A-scans are taken at blank point 1001. Then, a normal OCT XY scan 601 is performed. FIG. 10 illustrates normal XY scan 601 as a line scan pattern, but an XY scan can be any other type of scan patterns such as circle, raster, grid, or any other pattern. After completing normal XY scan 601, OCT imager returns XY scan 303 to blank period 1001 to start a new scan sequence.

During the blank period, when XY scan 303 places the beam at blank point 1001, data from line scan camera 305 is acquired and stored as background spectra. Typically, a number of background spectra are acquired. The background spectra contains data only from reference arm 310 because, while the beam is at blank point 1001, nothing will be reflected back into sampling arm 309. Because the background spectra is updated for every scan sequence (or every OCT image frame), the background spectra represents the true background spectra, including the effects of environmental changes, which are typically slower than OCT image frame rates (typically >5 Hz). A background spectrum can be calculated by averaging the number of background spectra, which increases the signal-to-noise ration. Further, computer 307 can also monitor the power received by line scan camera 406 to determine whether spectrometer 305 is aligned or whether an auto-alignment step needs to be performed.

Figure 11:
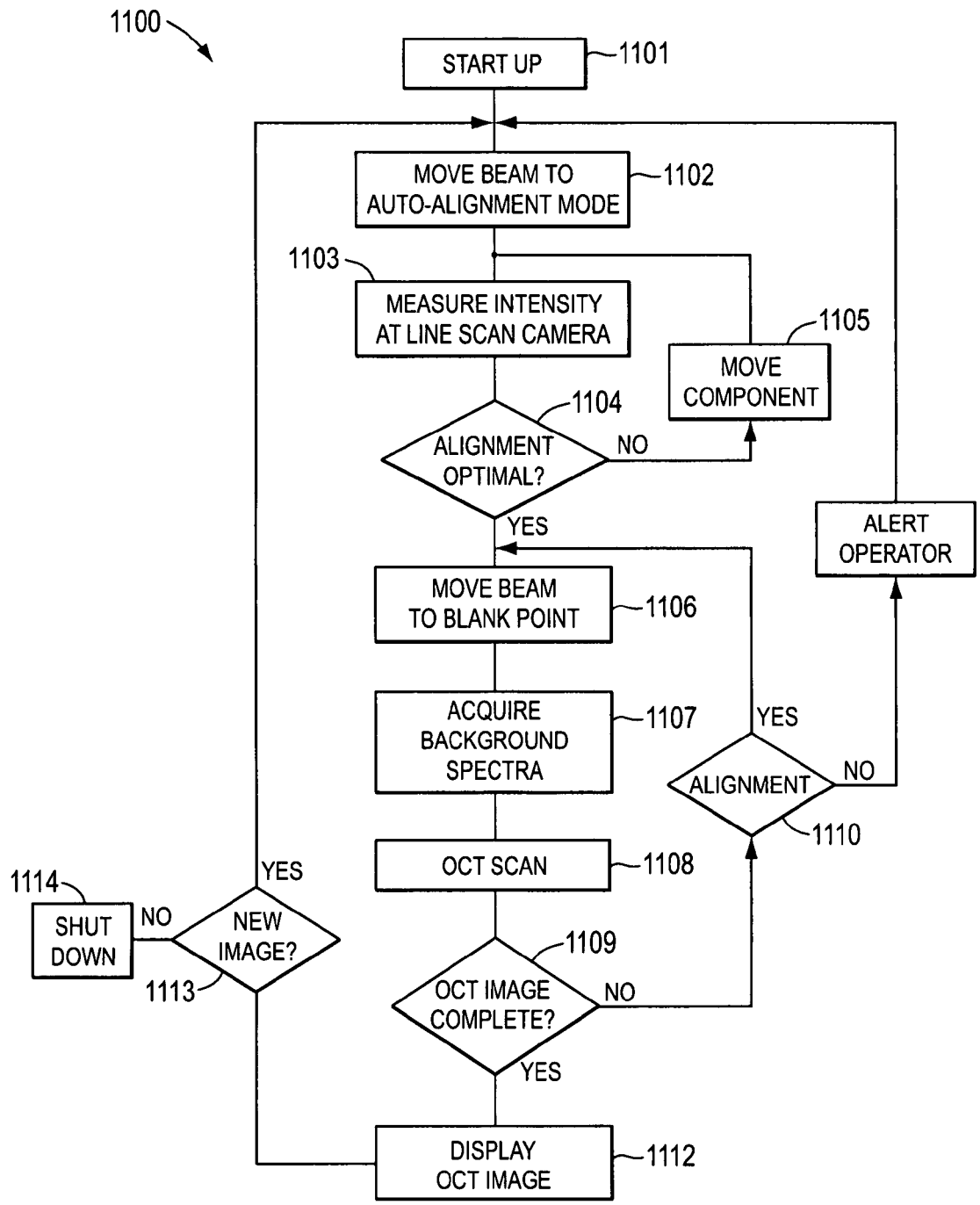
FIG. 11 shows a flow diagram for performing an OCT imaging session according to some embodiments of the present invention.

FIG. 11 illustrates an OCT imaging session 1100 according to some embodiments of the present invention. Imaging session 1100 starts in start-up block 1101. In start-up block 1101, the OCT imager is powered up, light source 301 is activated, computer 307 is turned on, and the appropriate software loaded. Once OCT imager 300 is completely powered, the auto-alignment sequence is initiated. As shown in FIG. 11, in step 1102 computer 307 directs XY scan 303 to enter alignment scan mode 602. In step 1103, data is acquired from line scan camera 406. In step 1104, OCT imager 300 determines, as discussed above, whether the beam from detector arm 311 is aligned with detectors 501 and 502 of line scan camera 406. If alignment is not yet optimal, an optical component such as folding mirror 403 is adjusted in step 1105 and the process returns to step 1103. If the alignment is optimal (e.g., a maximum intensity is present at detectors 501 and 502), then OCT imager 300 proceeds to acquire an OCT image.

As shown in FIG. 11, in step 1106, XY scan 303 moves the beam to blank point 1001. In step 1107 a number of background spectra are taken with the beam at blank point 1001. In that position, no light is reflected into sampling arm 309 and only light reflected into reference arm 310 is measured in spectrometer 305. Any number of individual spectra can be can be taken in step 1107, for example sixteen spectra may be taken.

Once the background spectra are taken, an OCT XY scan is performed in step 1107 to obtain an OCT spectrum. XY scan 303 is then set to perform a normal XY scan within imaging field 600. The OCT spectrum, which is an interference signal formed by combining in coupler 302 the reflected signals from sampling arm 309 and reference arm 310, is processed to obtain an OCT image.

Figure 12:
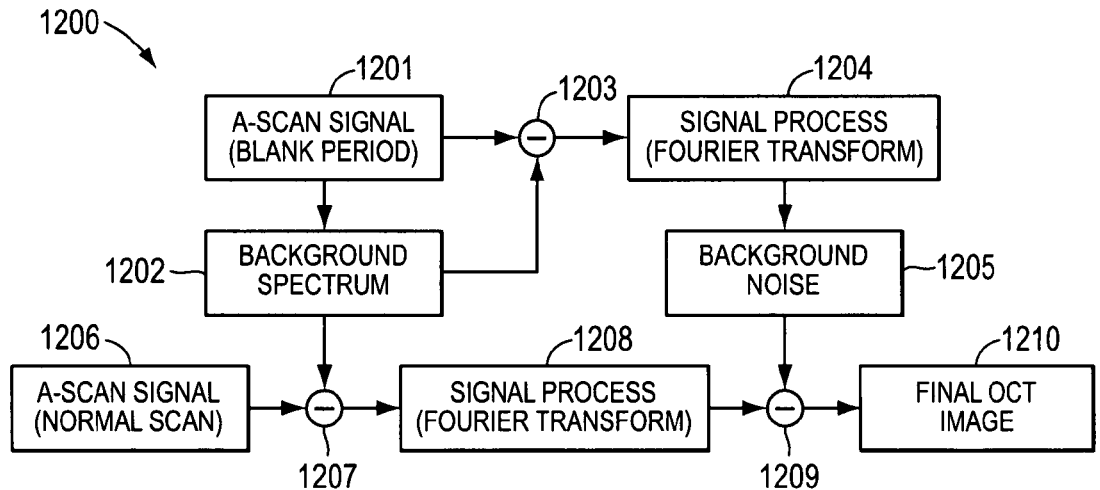
FIG. 12 illustrates signal processing in an OCT imaging session according to some embodiments of the present invention.

FIG. 12 illustrates a digital processing process 1200 of an OCT spectrum to obtain an OCT image, which may be formed in OCT scan step 1108 of FIG. 11. Block 1201 in FIG. 12 is the background spectra taken in step 1107 of imaging session 1101. As discussed above, there may be any number of spectra taken. In block 1202, all of the background spectra are averaged to form an average background spectrum.

Normalizing the OCT spectra by subtracting an average background spectrum, however, can not remove 1/f noise. The noise background of a normalized OCT spectrum may still be non-uniform because of 1/f noise. To solve the 1/f noise problem, the background spectra itself is processed. As shown further in FIG. 12, the average background spectrum is subtracted from each of the background spectra in operation 1203. Each of the normalized background spectra is then processed in step 1204 by Fourier transformation and the resulting processed spectra averaged to form a background noise in step 1205. The average of the processed background spectra, the background noise of step 1205, represents the background noise as a function of depth location. OCT spectra taken during the normal scan period, normalized by subtracting the average background spectrum, processed by Fourier transformation, and normalized again by subtracting the background noise can have uniform background noise and result in more consistent image strength at different depth locations.

As discussed above, an XY scan is performed by positioning the beam at a series of positions that form a pattern and taking an OCT spectrum at each position. This step is performed in step 1206. For each OCT spectrum, each in itself an A-scan, that form the scan, the average background spectrum of block 1202 is subtracted in operation 1207, the OCT spectrum is processed by Fourier transformation in block 1208, and the background noise is subtracted in operation 1209 to form an OCT image spectrum. All of the OCT spectra that form the XY scan are compiled in OCT image 1210 to form an OCT image.

Once the OCT scan is acquired and processed in step 1108, the OCT imager determines if the OCT image is complete in step 1109. If complete, the image is displayed in step 1112 and the OCT imager proceeds to step 1113 where the system is either shut down in step 1114 or a new session is begun. If the image is not complete, the OCT imager proceeds to step 1110. In step 1110, the alignment is checked by determining if the total power on line scan camera 406, as determined by the background spectra acquired in step 1107, has deteriorated to an extent that requires realignment. If so, the OCT imager proceeds to step 1111 where the operator is alerted and then auto-alignment is begun at step 1102. If not, then the OCT imager proceeds to step 1106 where a new XY scan process is started.

The embodiments described above are exemplary only and are not meant to be limiting in any way. One skilled in the art may recognize numerous modifications that can be made in the systems described. These modifications are meant to be within the scope of this disclosure. As such, the invention is limited only by the following claims.

What is claimed is:

1. An OCT imager, comprising:
  a coupler coupled to receive light from a source arm and provide the light to a sampling arm and a reference arm, the coupler also coupled to receive reflected light from the sampling arm and the reference arm and provide a combined interference signal to a detector arm;
  a broadband light source coupled to provide light to the source arm;
  an optical delay line coupled to receive light from the reference arm and reflect light back into the reference arm;
  an XY scan coupled to receive light from the sampling arm, direct that light onto a sample, capture reflected light from the sample, and couple the reflected light from the sample back into the sampling arm, the XY scan including an alignment position where no light is reflected back into the sampling arm;
  a spectrometer coupled to receive the combined interference signal from the detector arm to provide spectrum data, the spectrometer including at least one controllable component; and
  a controller that adjusts the at least one controllable component in response to spectrum data taken while the XY scan is in the alignment position so that the spectrometer is aligned.

2. The imager of claim 1, wherein the spectrometer includes
  a folding mirror coupled to receive the combined interference signal from the detector arm;
  a transmission grating coupled to receive the reflected interference signal from the folding mirror; and
  a line scan camera coupled to receive diffracted light from the transmission grating.

3. The imager of claim 2, wherein the spectrometer further includes a collimator lens coupled to direct the interference signal onto the folding mirror and a focusing lens coupled to direct the diffracted signal from the transmission grating onto the line scan camera.

4. The imager of claim 2, wherein the at least one controllable component is the folding mirror, the folding mirror including
  a mirror;

an actuator coupled between the mirror and a frame, the actuator adjusting its length in response to an electrical signal; and a spacer coupled between the mirror and the frame, the mirror rotating on the spacer as the actuator is adjusted.

5. The imager of claim 2, wherein the spectrometer includes a reflective diffraction grating and the at least one controllable component is the reflective diffraction grating.

6. The imager of claim 4, wherein the actuator is a piezoelectric actuator.

7. The imager of claim 4, further including a spring coupled to hold the mirror snug against the actuator and the spacer.

8. The imager of claim 4, wherein the controller provides the electrical signal in response to a difference in intensity measured by a first set of detectors in the line scan camera and intensity measured by a second set of detectors in the line scan camera, the second set of detectors being interspersed between the first set of detectors and laterally offset from the first set of detectors.

9. The imager of claim 1, further including a computer, the computer executing software that
receives data from the spectrometer;
includes the controller; and
compiles an OCT image.

10. A method of auto-aligning an OCT imager, comprising:
adjusting an XY scan so that no light is reflected into a sampling arm;
coupling light reflected into a reference arm to a spectrometer;
measuring intensity in a line scan camera in the spectrometer; and
adjusting an optical component of the spectrometer to align the spectrometer.

11. The method of claim 10, wherein the spectrometer diffracts light into a line depending on wavelength;
detects the light as a function of position on the line; and
provides electrical signals indicative of the light intensity as a function of wavelength.

12. The method of claim 10, wherein the spectrometer includes a mirror directing light onto a transmission grating and adjusting the optical component includes adjusting the mirror.

13. The method of claim 12, wherein adjusting the mirror includes providing a voltage to a piezoelectric actuator coupled to adjust the position of the mirror with respect to the transmission grating.

14. The method of claim 13, wherein adjusting the mirror includes determining the difference between total intensity measured by a first set of detectors of the line camera and total intensity measured by a second set of detectors of the line camera and adjusting the voltage to the piezoelectric actuator in response to the difference.

15. The method of claim 14, wherein the second set of detectors is interspersed between the first set of detectors and laterally offset.

* * * * *